(No Model.) 2 Sheets—Sheet 1.
E. WESTON.
ELECTRICAL MEASURING APPARATUS.
No. 392,387. Patented Nov. 6, 1888.
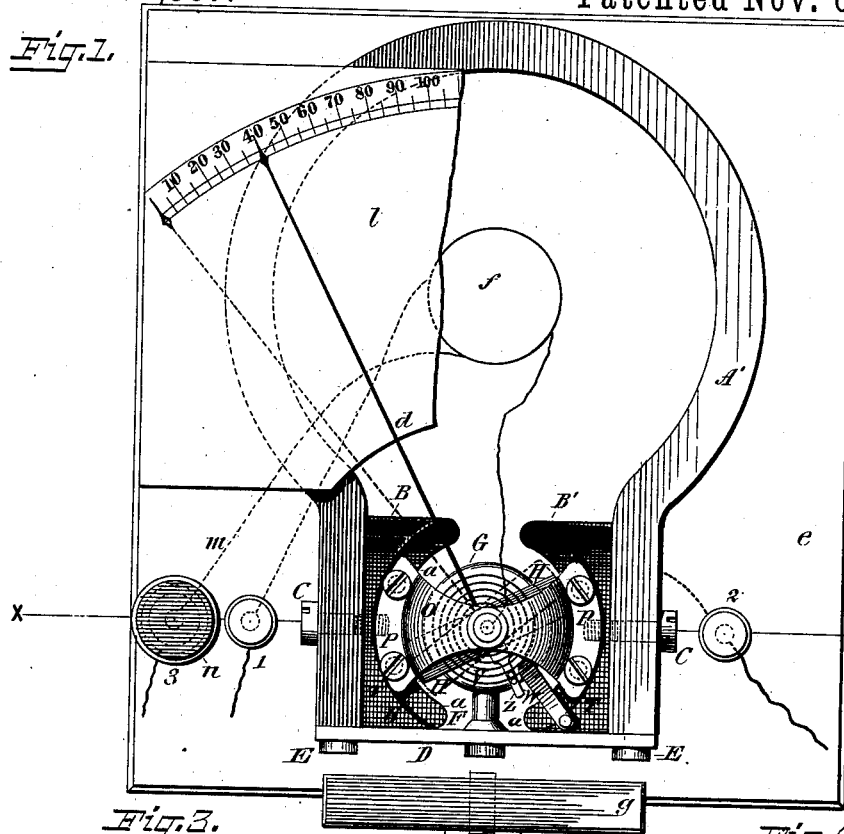
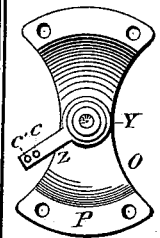
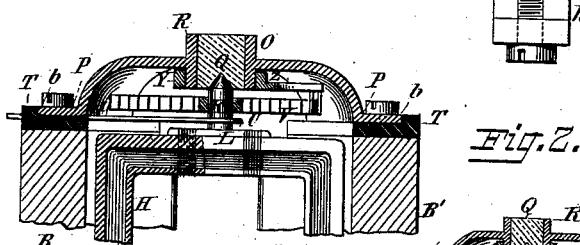
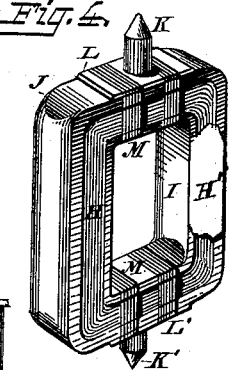
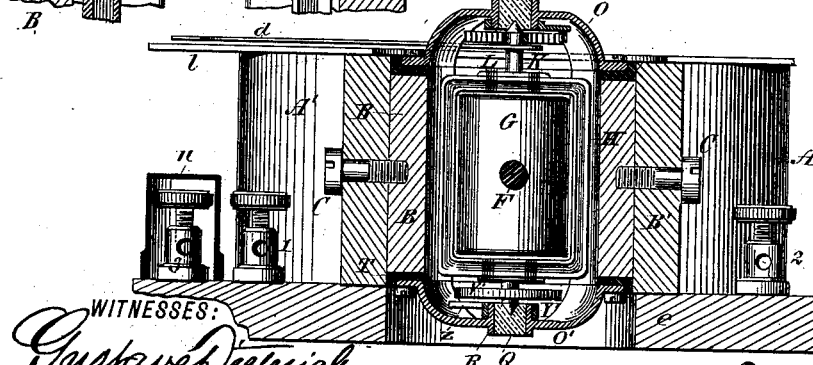
WITNESSES: Gustave Dieterich, C. A. Dieterich.
INVENTOR. Edward Weston. BY Park Benjamin, his ATTORNEY.

(No Model.) 2 Sheets—Sheet 2.

E. WESTON.
ELECTRICAL MEASURING APPARATUS.

No. 392,387. Patented Nov. 6, 1888.

WITNESSES:
Gustave Dieterich
C. A. Dieterich

INVENTOR,
Edward Weston.
BY Park Benjamin,
his ATTORNEY.

UNITED STATES PATENT OFFICE.

EDWARD WESTON, OF NEWARK, NEW JERSEY.

ELECTRICAL MEASURING APPARATUS.

SPECIFICATION forming part of Letters Patent No. 392,387, dated November 6, 1888.

Original application filed March 17, 1888, Serial No. 267,474. Divided and this application filed August 17, 1888. Serial No. 282,991. (No model.)

*To all whom it may concern:*

Be it known that I, EDWARD WESTON, of Newark, Essex county, New Jersey, have invented a new and useful Improvement in Apparatus for the Measurement of Electricity, of which the following is a specification.

My apparatus is more particularly designed for the measurement of the electro-motive force of electrical currents in volts. Its principle is as follows: To organize and construct an apparatus wherein the current to be measured in circulating through a coil or loop in the circuit, which coil is supported so as to be free to move in a uniform magnetic field, shall cause a movement of said coil due to the resultant effect thereupon of the said current and the magnet-poles; to oppose to the motion of said coil so produced a uniform resilient resistance, so that the extent of movement of said coil shall be directly proportional, or very nearly so, to the strength of the actuating-current, or, when said current is previously caused to traverse an interposed electrical resistance, to the electro-motive force of said current; and, finally, to indicate the extent of such movement and hence the corresponding electro-motive force upon a suitable scale; also, to prevent undue oscillation of the coil by combining therewith a mass of diamagnetic metal to which an intense magnetic field acts as a retarding medium, thereby producing a magnetic dash pot or brake, and to combine such diamagnetic mass with the said coil in such a way as to enable said mass to act to the maximum magnetic and mechanical advantage in checking said oscillation.

Figure 6:
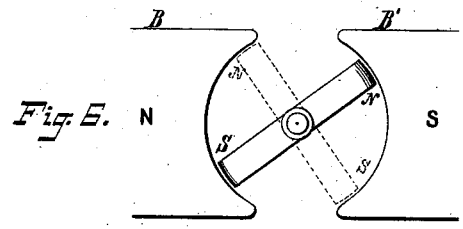
Figure 7:
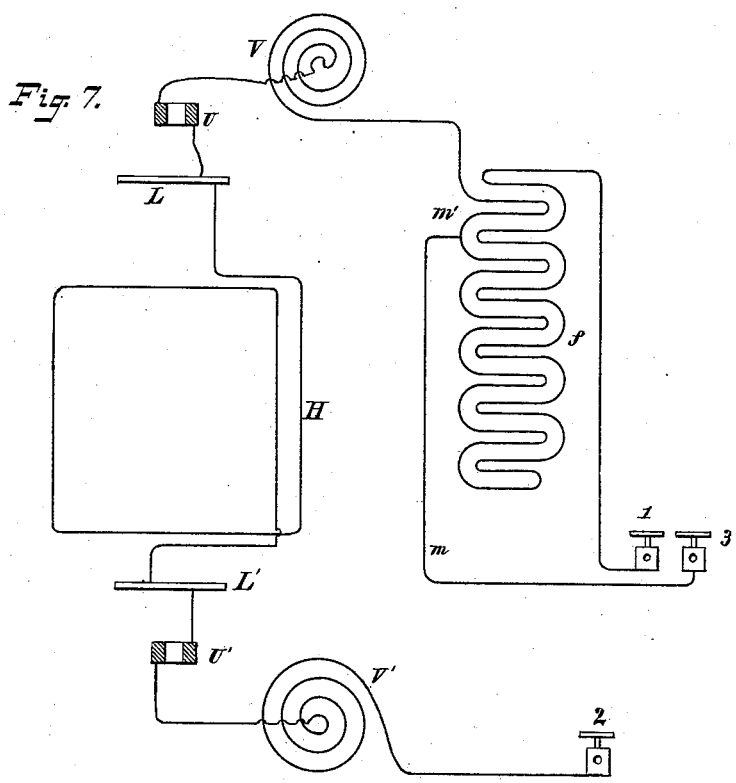

In the accompanying drawings, Figure 1 is a plan view of my new measuring-instrument with a portion of the scale-plate broken away. Fig. 2 is a section on the line *x x* of Fig. 1. Fig. 3 is a partial section on the same line on a larger scale than Fig. 2. Fig. 4 is a perspective view of the coil separately. Fig. 5 is a view of the inner side of one of the bridges O O'. Fig. 6 is a diagram illustrating the relative polarities of the coil H and magnet-poles B B'. Fig. 7 is a diagram showing the circuits in the instrument.

Similar letters of reference indicate like parts.

A is a permanent magnet, which is here shown as having a circular body, A', and polar extremities with their inner faces relatively flat and parallel. To said inner faces are attached pole-pieces B B' by means of screws C. The opposing faces of the pole-pieces B B' are concave, so that between said pole-pieces a substantially-cylindrical opening is produced.

Extending across the ends of the magnet A is a bar, D, of brass or other diamagnetic material, which is secured to said magnet by bolts or screws E. Attached to the middle point of said bar D is a rod or pin, F, which supports a solid cylinder, G, of iron or other magnetic material. This cylinder is concentrically disposed with reference to the cylindrical space between the pole-pieces B B'. It is, however, both shorter and of less diameter than said cylindrical space, so that there is a free space at both its extremities and an annular interval between its periphery and the concave faces of pole-pieces B B'.

H is a hollow coil of insulated wire, which incloses a frame, I, of copper or other diamagnetic metal, and is itself inclosed in a frame, J, of similar material, as shown in Fig. 4. The copper frame J is thicker than the copper frame I. Each side or face of the coil is covered with a plate of copper, one of which is shown broken away at H'. The whole coil H is therefore inclosed on all sides in an envelope of diamagnetic metal.

K K' are pivot-pins, of metal, fixed to metal plates L L'. The plates L L' are secured to opposite ends of the frame J, as shown, by any insulating cement, or a layer of insulating material may be inserted between said plates and the metal frame J, and the said plates may be bound to the coil by wrappings M of silk thread. In fact, any mode of connecting the plates L L' and frame J may be adopted which shall not result in said frame forming a short circuit between said plates. One end of the wire composing the coil H connects to the plate L and the other end of said wire to the plate L'.

At the ends of the pole-pieces B B' are formed recesses *a*, the shoulders *b* of which conform to the truly circular curve of the concave portions of said pole-pieces. O and O' are two precisely similar bridges having a central elevated portion and flanged edges P. The curve of the outer periphery of the flanges P is truly circular. The flanges P enter the recesses $a$. Therefore the peripheries of said flanges correspond to and exactly fit against the curved inner shoulders, $b$, of the recesses $a$; but the curves of the shoulders $b$ and recesses $a$ correspond to the truly circular concavity in the faces of the pole-pieces B B'. Therefore it is necessary simply to adjust the flanges P of the bridges O O' in the recesses $a$, as described, to bring central points of the two bridges O O' and the longitudinal axis of the fixed cylinder G in a straight line. At the central points of the bridges O O' are fixed sleeves R, which receive jewels Q, in which jewels the conical ends of the pivot-pins K K' are received and in which said pins freely turn. The fixed cylinder G then is supported in the hollow space inside of the inner frame, I, and the coil H, with its frames, surrounds said cylinder and turns in the annular space between the cylinder periphery and the pole-pieces B B'.

The advantage of the particular construction above set forth lies in the great ease with which it allows of exactly centering the coil H, for, as I have shown, when the bridge-flanges P meet the curved shoulders $b$ of the recesses $a$ the central points of the two bridges O O', and hence the pivot-bearings there located, come directly opposite each other and in prolongation of the longitudinal axis of cylinder G, so that the constructor has merely to see that shoulders $b$, recesses $a$, and flange-edges P are truly circular and that the pivot-bearings are centrally located in the bridges O O' to be assured that the parts will come together when assembled with the pivot-bearings truly centered. It follows, also, that for all instruments of a certain size the parts may thus be made interchangeable and produced by milling or other machinery for automatically making exact reproductions—a result which, as is well known, materially reduces the cost of manufacture.

The flanges P, as here shown, rest in circular recesses $a$, made in blocks of insulating material, T, which are applied to the edges of the pole-pieces instead of in similar recesses formed in the edges of the pole-pieces themselves. This is simply an incident of the particular construction here shown due to the lead of the circuit chosen. It should of course be understood that I may dispense with the blocks T and form the recesses $a$, as first described, directly in the pole-pieces B B', and if it be desired to insulate the bridges O O', or either of them, from said pole-pieces I may accomplish that result in any other of the known methods, which will readily occur to electrical workmen and others skilled in the art.

Surrounding the pivot-pins K K' are tight washers or rings U U', to which rings are fastened the inner ends of coiled springs V V'. The outer ends of springs V V' are held in arms W, which are secured to the insulating-blocks T.

The sleeves R extend beyond the inner faces of the bridges O O' and receive upon them rings Y Y', which rings carry arms Z Z'. On each arm are pins $e\ e'$, Fig. 5, between which pins the coiled spring is received, as shown best in Fig. 3. The rings Y Y' are a close fit upon the sleeves R, but may be turned on said sleeves. In this way the arms Z Z' may operate as moving abutments for said springs, and may be adjusted so as to lengthen or shorten the active part of said springs by simply moving them to the right or left at will.

To the pivot-pin K is secured a light needle, $d$, which extends over a plate, $l$, upon which is inscribed a scale of regular divisions. In the case $e$ of the instrument I place a resistance-coil, $f$, reverse wound in the usual way.

Directly in front of the polar extremities of magnet A is a bar, $g$, of iron or other magnetic material, which, by means of the adjusting-screw $h$, may be moved at will nearer to or farther from said extremities of the magnet.

The circuit in the instrument, as here shown, can be conveniently traced in Fig. 7, and proceeds as follows: From the binding-post 1 on the base-board of the instrument to and through the resistance-coil $f$ to bridge O, arm Z, spring V, ring U, pin K, plate L, coil H, plate L', pin K', ring U', arm Z', bridge O', and binding-post 2.

I will now describe the operation of the instrument. The coil H is an assemblage of parallel loops in the circuit. The whole space occupied by a loop when a current traverses the wire behaves, as is well known, like a magnetic shell—that is, as if the loop and inclosed space were simply a magnet in slab form, one face of the magnet exhibiting north and the other face south polarity. Thus in Fig. 4 the face turned toward the observer and comprising all that area included within the frame J might be of one polarity, while the face turned from the observer, and likewise included within said frame, might be of the other polarity. Now, the polarity of either face of the coil will depend upon the direction of the current circulating in the coil, so that, for example, if the current circulated through the coil from pin K to pin K' the face turned to the observer in Fig. 4 might show north polarity, while if the current moved from pin K' to pin K that same face might show south polarity. If, then, the coil H is placed in proximity to a magnet, it will act when the current is traversing it with reference to that magnet just as any other magnet would act—that is, if the face of the coil in proximity to a given pole of the magnet is of like polarity the pole of the magnet and face of the coil will mutually repel, and, equally, if the face of the coil and pole of the magnet be of unlike polarity they will mutually attract. If, however, the magnet be fixed and immovable and the coil be freely suspended and movable, then the coil alone will be attracted to or repelled from the magnet-pole, as the case may be.

Referring, now, to the permanent magnet A, it will be observed that I have so arranged that magnet and its pole-pieces B B' as to produce a very intense field of force in the cylindrical space between said pole-pieces. I have also placed in the center of this field a mass of inductive metal, the cylinder G, which acts to draw the lines of force into itself; or, in other words, to prevent their diverging or straying into regions outside of the intense limited field, which is desired. In this field I delicately poise the coil H, so that it is free to vibrate on its pivot-pins K K', but not completely to rotate, for the pin F, which supports the cylinder G, will of course prevent complete rotation of the coil around the cylinder.

Now, suppose that the coil be so adjusted in the field that its normal position is that represented in Fig. 1, dotted lines, or in Fig. 6, full lines, when no current is flowing. Suppose, further, that the left-hand pole-piece, B, be of north polarity and the right-hand pole-piece, B', be of south polarity. Suppose, also, that the current circulating in the coil moves in such direction that the face of the coil opposite the north-pole piece be of south polarity and the face of the coil opposite the south-pole piece be of north polarity, as indicated by the letters S N in Fig. 6. The result will be that the north pole of the permanent magnet will attract the south side of the coil and the south pole of the magnet the north side of the coil, and the attraction of the two poles will act as a couple tending to turn the coil on its pivots in the direction of the arrow, Fig. 6, until the coil has traversed half its path, or an angle of forty-five degrees. Then the north side of the coil will be opposed to the north pole of the magnet and the south side of the coil to the south pole of the magnet, and repulsion will follow, which, however, will tend to move the coil still in the same direction, so that the coil will finally assume a position at an angle of ninety degrees from its original position, as indicated by the dotted lines in Fig. 6. If no resistance whatever were opposed to the movement of the coil, then, theoretically, any current which would polarize it as above described would cause it to travel from one extreme limit of its path to the other; but if to the motion of the coil a constant resistance is opposed always directly proportional, or nearly so, to the extent of its travel, then the coil will move only to a point at which equilibrium exists between the force which moves it and the force which opposes its motion. Now, the force which tends to move the coil is due to the current which passes through it, and the magnitude of this force depends upon the strength of the magnet-poles, upon the length of wire in the coil, and upon the strength of the current. The magnet A being a permanent magnet and the field of force between its poles being concentrated and exceedingly intense, the strength of this field may be regarded as constant. So, also, the length of wire in the coil is constant. Consequently the magnitude of the moving force is directly proportional to the current strength. The opposing force to the movement of the coil is the resiliency of the coiled springs V V', which are wound up, so to speak, as the coil turns. This resistance is also a constant force and directly proportional to the extent of movement of the coil. Therefore the only variable force will be that of the strength of the current, and the extent of movement of the coil will measure this strength, because the coil will come to rest at a point where the resistance of the spring and the moving force of the current balance. This extent of movement is conveniently shown by the traverse of the needle d, attached to the coil-pivot K, over the graduated scale Z, which scale may be uniformly divided into regular intervals, because, as already stated, for twice the current strength the coil will move over double the distance, and so on proportionately to the limit of its possible travel.

I design this instrument principally for the measurement of current-pressure or electro-motive force in volts. To this end I support the coil upon jeweled pivots, as already explained, so that it will turn with the minimum of friction, and I oppose to its movement the resiliency of a pair of very delicate springs. In the path of the current before it reaches the coil I place a high resistance very large in proportion to the internal resistance of the dynamo or battery the current-pressure of which is to be measured. The strength of the current which will reach the coil H will then depend only on the difference of potential existing between the ends of the resistance-coil. Consequently the coil H will move and the needle d will swing over distances on its scale exactly proportional to the electro-motive force of the current traversing the coil H. If now we know the total electro-motive force necessary to cause a movement of the coil over its entire path, and hence of the needle over the whole scale, it remains simply to lay off the scale in equal divisions in order to recognize the fractional electro-motive force present when the needle comes to rest before reaching its extreme limit of travel, or, in other words, and to illustrate, if a current having an electro-motive force of fifty volts after traversing a certain resistance is of sufficient strength just to move the index-needle over its entire path, then a current of twenty-five volts, the resistance remaining the same, will be indicated by the needle coming to rest half-way between its limits, and so on.

It will be obvious that by varying the interposed high resistance I may increase or diminish the current strength, and consequently the extent of swing of the needle corresponding to a given electro-motive force, or with different electro-motive forces produce an equal swing of the needle, so that if, for example, a given current with a resistance of one thousand ohms interposed produces a deflection of the needle over a space of one hundred scale-divisions, representing, for example, an electro-motive force of one hundred volts, the same current with a resistance of but ten ohms interposed would cause a like deflection of the needle with an electro-motive force of but one volt. In the former case the instrument would measure to volts, in the latter case to hundreds of volts, the same deflection representing either a volt or one one-hundredth of a volt. It follows therefore that in designing the instrument for low-pressure currents, which it is desired to measure accurately to fractions of volts, I provide a low resistance in the circuit and produce very large deflections of the needle per unit of measurement. On the other hand, if high-pressure currents are to be measured without special regard to fractions of the unit, I provide a very high resistance and give the needle a much smaller deflection per unit. The point which I desire particularly to impress here, and I know of no other electrical measuring apparatus of which it is true, is that the sole factor which operates to move the needle is current strength made dependent upon the electro-motive force, and that I simply and in every instance weigh this current strength against constantly-increasing resistance here provided by the springs. It is perfectly immaterial whether the electro-motive force be high or low. Whatever the corresponding current strength may be the instrument weighs it. If the current strength is greater, the coil will move a greater distance, and so compress the spring more before a balance is reached. If it be less, then the coil will move a less distance, and so compress the spring less before equilibrium results. In either case the movement of the coil, and consequently of the needle in arc, other things being equal, is proportional to the pressure of the current and measures it. Not only, therefore, is it possible to adapt this instrument to the measurement of the pressure of the most powerful as well as to that of the weakest currents, but it can be designed to give large deflections for currents of very low pressure, so that such currents can thus be measured with a refinement of accuracy now impossible, save perhaps with apparatus of the most expensive and elaborate character. Further than this, it is a very simple matter to maintain the accuracy of the instrument, even despite possible changes in the magnetic field of the permanent magnet by reason of the ease with which it can be calibrated. To do this requires no special skill whatever, as will readily be apparent from the following description of the operation.

At 3, Figs. 1, 2, and 6, is shown a binding-screw which connects by a wire, $m$, with the interposed resistance-coil, $f$, at such a point, as $m'$, Fig. 6, thereon as that a current proceeding from said post 3 through the instrument does not traverse the entire resistance-coil, but only some known fraction of it. To the post 3 is now to be connected any standard cell of known electro-motive force—say one volt—and the deflection of the needle due to the current is noted. The resistance may be proportioned so that this deflection may be considerable. As now the proportion which the whole resistance bears to this fractional resistance is known, it follows that it is necessary simply to consider this difference in determining the deflection due to the same current-pressure when the whole resistance is in circuit; or, to illustrate, if with the fraction of the resistance in circuit with a standard cell of an electro-motive force of one volt the needle shows, for example, ten degrees deflection, then if the total resistance be ten times as great one-degree deflection will correspond to a current-pressure of one volt with absolute certainty.

I propose for practical use to arrange the circuit substantially as already described—that is, with a separate binding-post, 3, and wire for calibration purposes. As, of course, it would be very injurious to the coil H to pass a strong current accidentally through the fractional resistance, I cover the post 3 with a rubber screw-cap, $n$, which normally is to be left in place, the object being to prevent connection to the post 3 unless the user first removes the cap, which it is presumed will not be done unless advisedly.

I have already stated that the strength of the field of the permanent magnet is a factor in determining the influence of the current upon coil H, and that this is practically a constant. Where, however, the instrument is intended to measure with accuracy, and also for purposes of calibration, it may be desirable to have a means of altering the strength of this field. This means I provide in the movable bar or keeper $g$, which, as has been stated, may be advanced nearer to or farther from the poles of the magnet by the adjusting-screw W. When the bar $g$ is brought near to the field, a number of the lines of force will flow into said bar and out of the space between the magnet-poles, so weakening the field. Conversely, when the bar is retracted less lines of force will flow into it, and hence the field will be stronger by the accession thereto of these lines of force.

It is also desirable to provide a means of adjusting the resiliency of the springs V V′, so as to be able to be set with reference to the scale the points of equilibrium of current and springs. This I accomplish by the movable arms Z Z′, which, as I have stated, when moved in one direction shorten the springs and in the other direction lengthen them, in one case reducing, in the other increasing, the electricity of said springs, and hence modifying their resistance to the movement of coil H.

Referring now particularly to the coil H, it has already been stated that said coil is wholly inclosed in an envelope of copper or other diamagnetic metal, the parts of said envelope being the outer frame, J, inner frame, I, and side plates, H'. The longitudinal faces of the frame J are rounded or convex, so as to conform to the curve of the concavities in the pole-pieces B B', and the similar faces of the frame I are rounded or concave, so as to conform to the curve of the cylinder G. It will also be observed from Fig. 4 that the frame J is made thicker than the frame I.

The object of this construction is as follows: It is a well-known fact that when a body of diamagnetic metal—such as copper—is suspended between the poles of a powerful magnet it finds in the field of force a powerful resisting medium which opposes any motion of the metallic mass and speedily brings it to rest. I propose to utilize this phenomenon in order to prevent undue oscillation of the coil H, which, as already explained, is inclosed in and so has rigidly connected to it a mass of copper, or, in other words, to render the instrument "dead-beat," the needle simply moving to the point on the scale corresponding to the number of volts electro-motive force of the current and remaining there. The moving mass of copper in the strong magnetic field acts very much like the moving piston in the mechanical dash-pot containing water, oil, or glycerine, and, in fact, I may term the device a "magnetic" or "electrical" dash-pot. In order to secure more effective results, I distribute the mass of copper in greatest proportion in the thick outer frame, J, which, being nearest to the poles of the permanent magnet, is necessarily in the strongest part of the field. So, also, said frame is farthest from the center of motion of the coil, and hence any retarding force there applied exercises the greatest possible leverage upon the coil. In practice I make the dimensions of the frame J such that it will just clear the faces of the pole-pieces B B' and the dimensions of the frame I so that it will just clear the periphery of the cylinder G. The result is that the coil, cylinder, and magnet-poles so closely approximate that I have substantially a closed magnetic circuit between the magnet-poles at all times, the coil and cylinder, in fact, becoming a keeper or armature for the magnet, always in place, and serving the purpose of preventing loss of strength of the magnet and of keeping its energy in constant activity. The coil H and diamagnetic metal united thereto, being in the field of a permanent magnet, is in a field everywhere uniform, hence the dampening effect of the copper is the same in all positions of the coil.

It will also be noted that the coil turns wholly within the circle partly completed by the concave faces of the pole-pieces. Hence in all positions of the coil the whole of it is in the field, no portion extending into the adjacent space.

This application is a division of another application for Letters Patent, Serial No. 267,474, filed by me March 17, 1888.

I claim—

1. A permanent magnet and movably supported in the field of force thereof a paramagnetic body inclosed in a continuous mass of diamagnetic metal, the said mass operating to retard or oppose the motion of said paramagnetic body, substantially as described.

2. A permanent magnet, an electrical conductor in the form of a coil or loop movably supported in the field of force of said magnet, and a band or frame of diamagnetic metal connected to and inclosing said coil or loop, substantially as described.

3. A permanent magnet, an electrical conductor in the form of a coil or loop movably supported in the field of force of said magnet, and a body of diamagnetic metal connected to and inclosed by said coil or loop and operating to retard or oppose the motion of said coil in the magnetic field, substantially as described.

4. A permanent magnet, an electrical conductor in the form of a coil or loop movably supported in the field of force of said magnet, and a body of diamagnetic metal inclosed by said coil or loop and connected thereto, substantially as described.

5. A magnet, an electrical conductor in the form of a coil or loop movably supported in the field of force of said magnet, and a band or frame of diamagnetic metal inclosing and a band or frame of diamagnetic metal inclosed by said coil or loop, the said first-mentioned frame being of greater thickness than said last-mentioned frame, substantially as described.

6. A magnet, an electrical conductor in the form of a coil or loop movably supported in the field of force of said magnet, and a shell or covering of diamagnetic metal inclosing said coil or loop, substantially as described.

7. A permanent magnet having pole-pieces inwardly curved or concave on their opposing faces, a mass of magnetic material conforming to the shape of the field between said pole-pieces and concentrically disposed and independently supported in said field, and an electrical conductor in coil or loop form surrounding said mass and vibrating on its axis in a path parallel to the line of curvature of said faces of said pole-pieces, substantially as described.

8. A magnet, an electrical conductor in coil or loop form supported and vibrating in the field of force of said magnet, a continuous mass of diamagnetic metal also in said field of force and connected to said conductor, and a resilient body interposed between said coil and an abutment, substantially as described.

9. A magnet, an electrical conductor in coil or loop form supported and vibrating in the field of force of said magnet, a resilient body interposed between said coil and an abutment, and means for varying the resiliency of said body, substantially as described.

10. A magnet, an electrical conductor in coil or loop form supported and vibrating in the field of force of said magnet, and a spring interposed between said coil and an adjustable abutment, substantially as described.

11. A magnet, an electrical conductor in coil or loop form supported and vibrating upon axial pivots in the field of force of said magnet, a coiled spring having its inner end connected to one of said pivots, and an independently-supported abutment receiving said spring near its outer end and movable upon said spring to vary the length of said spring between said point of attachment and said abutment, substantially as described.

12. A magnet, an electrical conductor in coil or loop form supported and vibrating upon axial pivots in the field of force of said magnet, and a coiled spring connected at its inner end to one of said pivots and at its outer end to an abutment, substantially as described.

13. A magnet, an electrical conductor in coil or loop form supported and vibrating in the field of force of said magnet, and a resilient body interposed between said coil and an abutment, in combination with a coil of definitely-high electrical resistance in electrical circuit with said vibrating coil.

14. A magnet, an electrical conductor in coil or loop form supported and vibrating in the field of force of said magnet, a resilient body interposed between said coil and an abutment, and a body of high electrical resistance and a body of relatively-low resistance, the said resisting bodies being in branch electrical circuit with said coil, substantially as described.

15. The permanent magnet A, having inwardly-rounded or concave opposite polar faces, bridge-pieces O O', coil H, having its axis entering bearings in said bridge-pieces, needle $d$, fixed to one of said pivots, and scale Z, substantially as described.

16. The permanent magnet A, having its opposite polar ends, B B', inwardly rounded or concave, similarly-curved recesses $a$ $b$ in the sides of said polar ends, bridge-pieces O O', having flanges P, with edges curved to conform to said recesses $a$ $b$, bearings centrally disposed in said bridge-pieces, and coil H, the axis of said coil being received in said bearings, substantially as described.

17. The permanent magnet A, having inwardly-rounded or concave opposite polar faces, bridge-pieces O O', coil H, having its axis entering bearings in said bridge-pieces, and fixed cylinder G, of magnetic material, independently supported within said coil, substantially as described.

18. The permanent magnet A, having inwardly-rounded or concave opposite polar faces, bridge-pieces O O', coil H, having its axis K K' entering bearings in said bridge-pieces, and coiled spring V, connected to said axis of said coil and to an abutment, W, substantially as described.

19. The permanent magnet A, having inwardly-rounded or concave opposite polar faces, bridge-pieces O O', coil H, having pivots K K', spring V, bearings R, ring Y, and arm Z, substantially as described.

20. The permanent magnet A, having inwardly-rounded or concave opposite polar faces, bridge-pieces O O', coil H, having its axis entering bearings in said bridge-pieces, fixed cylinder G, of magnetic material, independently supported within said coil, and adjustable body $g$, of inductive material, in proximity to the poles of said magnet, substantially as described.

EDWARD WESTON.

Witnesses:
D. H. DRISCOLL,
PARK BENJAMIN.